United States Patent [19]
Fujigaki et al.

[11] Patent Number: 5,407,721
[45] Date of Patent: Apr. 18, 1995

[54] ILLUMINATED SWITCHES AND RUBBER MATERIAL FOR THE COVER PIECE THEREFOR

[75] Inventors: Masahisa Fujigaki; Yasuko Kimura; Keiko Hartgae, all of Tokyo, Japan

[73] Assignee: Fuji Polymertech Co., Ltd., Tokyo, Japan

[21] Appl. No.: 156,318

[22] Filed: Nov. 19, 1993

Related U.S. Application Data

[62] Division of Ser. No. 52,096, Apr. 22, 1993.

[30] Foreign Application Priority Data

May 18, 1992 [JP] Japan .................................. 4-148985

[51] Int. Cl.⁶ .............................................. B32B 3/00
[52] U.S. Cl. ...................................... 428/72; 428/195; 428/201; 428/206; 428/209; 200/312; 200/314; 427/555; 427/400
[58] Field of Search ............... 428/195, 201, 206, 209, 428/76; 200/312, 314; 427/555, 400

[56] References Cited

U.S. PATENT DOCUMENTS

| | | | |
|---|---|---|---|
| 4,656,078 | 4/1987 | Goto | 428/204 |
| 5,234,744 | 8/1993 | Kenmochi | 428/195 |

*Primary Examiner*—James J. Seidleck
*Assistant Examiner*—I. Zemel
*Attorney, Agent, or Firm*—McGlew and Tuttle

[57] ABSTRACT

A finger touch member of an illuminated switch prepared by a process comprising printing or coating a surface of a multicomponent rubber material composed of, as essential components, 90–70% by weight of EPDM and 5–30% by weight of liquid polymerized butadiene rubber, with an ink of contemplated color, covering the entire top face of the resulting printed or coated cover piece with a light blocking coating layer and irradiating the so covered top face with a laser beam to cut out the coating layer in a contemplated pattern.

8 Claims, 1 Drawing Sheet

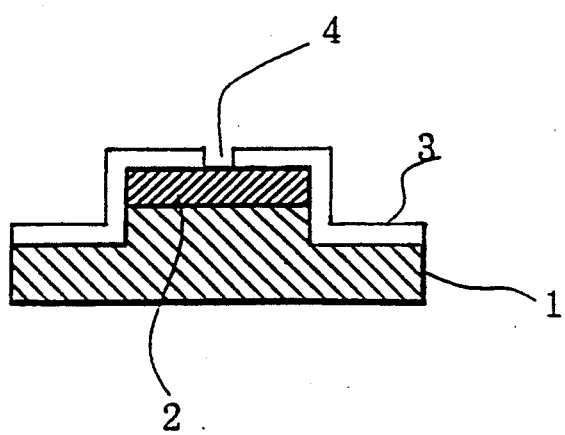

ILLUMINATED SWITCHES AND RUBBER MATERIAL FOR THE COVER PIECE THEREFOR

This is a divisional application of application Ser. No. 08/052,096 filed Apr. 22, 1993.

FIELD OF THE INVENTION

The present invention relates to illuminated switches to be employed, especially in dark sites on electric instruments, such as, on-vehicle telephones, portable telephones, wireless devices, car audio instruments and so on, as well as to a rubber material for the light-transmissible cover piece of finger touch member (denoted hereinafter as finger touch cover) of such illuminated switches, which is transparent and has a high affinity to the printing ink to be applied thereto together with a superior processability.

BACKGROUND OF THE INVENTION

Heretofore, for the material of the light-transmissible finger touch covers for illuminated switches mentioned above, silicone rubber, exclusively has found practical use due to its light permeability and excellence in the heat resistance, weatherability and electric isolation performance.

For the inks to be printed on such finger touch cover, they have been limited only to those having film-forming components based on silicone because of their better compatibility with the silicone rubber for attaining a firm fixation on the cover. Such inks should reveal a high light-blocking ability, in order to attain a high relief contrast of the illuminated pattern and, therefore, are pigmented usually in black or dark gray color. Usually, carbon black is employed here as the coloring pigment in an amount of 10–20% or even more, based on the weight of the film-forming component (base polymer) of the ink.

While there have been used, in practice, inks based on silicone for printing the light-transmissible finger touch covers, as mentioned above, such inks have disadvantages of inferior wear-resistance and lower oil-resistant property. In particular, in case of using carbon black for obtaining black or dark gray colored ink, the amount of the base polymer per unit surface area of the printing layer is reduced correspondingly, resulting in a reduction in the wear-resistance so that the print may easily be worn out by rubbing with a finger upon repeated finger touch on the switch or by contact with other materials, such as clothes, etc. Moreover, the highly stuffed carbon black may easily be rubbed off and stain the finger.

Under these circumstances, employment of other rubber materials, including an ethylene-propylene rubber (EPDM), which also exhibit a superior transparency, for the material of finger touch cover may be considered. Thus, attempts had been made for realizing such possibility. However, no satisfactory durability of printing layer with any ink was attained.

As another approach for solving these problems, the inventors have attempted to develop a novel modified material for the finger touch cover of which material property is improved such that the bonding between the ink printing layer and the substrate finger touch cover made thereof is high enough to insure a high durability of the printing layer. The inventors have discovered that a multicomponent rubber material based on EPDM, combined with another elastomeric component based on butadiene rubber, reveals a high bonding performance to printing layer of various inks.

SUMMARY OF THE INVENTION

Thus, according to the present invention, a novel multicomponent rubber material exhibiting high bonding performance to the printing layer is provided, which comprises, in the uncured condition, a composition composed of, as essential components, 90–70% by weight of EPDM and 5–30% by weight of a lower polymerised butadiene rubber, which is a liquid under normal conditions.

The finger touch cover molded from the uncured composition according to the present invention provides a high durability of printing applied thereon with inks containing carbon black and various base polymers.

BRIEF DESCRIPTION OF THE DRAWING

The sole drawing is a schematic vertical section of an embodiment of a cover piece of finger touch member of an illuminated switch according to the present invention.

DETAILED DESCRIPTION OF THE INVENTION

The multicomponent modified rubber material based on EPDM according to the present invention is obtained by kneading a raw mixture composed of EPDM (ethylene-propylene-ethylylene norbornene), the liquid oligomer of butadiene and requisite additives, such as curing agent, filler etc., in an adequate proportion, with, if pertinent, addition of another butadiene oligomer, on a kneader and molding the so-kneaded mass in a mold into a cured cover piece for finger touch member of an illuminated switch.

On the cured finger touch cover prepared as above, an indication mark is printed with an ink containing, in particular, carbon black. Here, the carbon black content may preferably be restricted to 10% by weight or below, in order to prevent possible wearing-off of the carbon black. A matting agent based on silica may be incorporated in the ink composition for assisting further shading of the illuminated light. Ink compositions based on polyurethane are particularly suitable due to their high affinity to the EPDM-based modified rubber material according to the present invention. According to the present invention, cover pieces for the finger touch members for illuminated switches are provided, by which it is able to attain a higher wear-resistance of indication patterns printed thereon with various inks without necessitating use of expensive silicone rubber.

DETAILED DESCRIPTION OF PREFERRED EMBODIMENTS

Below, the present invention will be described in more detail by way of Examples.

EXAMPLE 1

To 100 parts by weight of an ethylenepropylene rubber (EPT-4045, a product of EPDM of Mitsui Petrochemical Industries, Ltd.), 20 parts by weight of an oligomerized butadiene (R45-HT, a product of Idemitsu Petrochemical Co., Ltd) and 35 parts by weight of a commercial filler product (Nipseal LP), made by Nippon Sirika Industry Corporation, having an average particle diameter of 16 $\mu$m and a refractive index of 1.45 together with each requisite amount of adjuvants including coupling agent and strengthening (reinforcement) agent (SiO$_2$), and the resulting mixture was kneaded on an open roller kneader to prepare a premix, which was molded in a heated mold into a cover piece of a finger touch member for an illuminated switch.

Test pieces were prepared by printing on the so-molded finger touch cover a pattern with either one of inks based on polyurethane, polyvinyl chloride and fluororesin. On these test pieces, a rubbing peel-off test for the printing layer was carried out by rubbing the printed pattern with a nail of a human finger. As a blank test, a finger touch cover molded with a rubber premix of corresponding composition, but without the butadiene component, was employed. In addition, a comparative test piece was prepared also in the same manner with the exception that the elastomer components of the premix according to the present invention were replaced by a silicone rubber (SE1187U, a product of Toray Industries, Inc.)

The printing layer on the test piece for the blank test was peeled off from the interface between it and the substrate test piece when rubbed intensely with a fingernail. The printing layer on the comparative testpiece was peeled off from the interface even by rubbing with the finger. The experimental result of a checkerboard pattern cross-cutting peel off test for the silicone rubber test piece with either one of the inks was found to be 80/100 in the proportion of number of retained squares per 100 squares.

All the test pieces according to the present invention revealed a result of the nail rubbing peel off test in which the printing layer was found to be so firmly bound to the substrate cover piece that the printing layer persisted until the internal cover piece was broken up upon scratching out with excessively intense force. The checkerboard pattern cross-cutting peel test for all the test pieces also resulted in a value of 100/100. Thus, it was confirmed that the multicomponent rubber material according to the present invention has a superior ability of bonding the printing layer of various inks firmly thereto.

As an additional experiment, similar test pieces were prepared using a rubber premix having a composition corresponding to that of the first-said rubber premix according to the present invention with an exception that another kind of oligomerized butadiene rubber (JSR BR-01) was added in an amount of 5 parts by weight. The test results for these test pieces showed that the resiliency of the rubber material became higher and the bonding of the printing layer to the substrate was further increased. Thus, a multicomponent rubber which is more suitable for the finger touch cover was obtained.

EXAMPLE 2

An illuminated switch was prepared with a finger touch member having a cover piece as shown in the appended Drawing by the numeral (1) which was prepared by applying onto the cover piece (1) produced as in Example 1 a printing layer (2) with an ink of contemplated color based on polyester or polyurethane and covering then the entire surface of the cover piece (1) with a light-blocking coating layer (3), followed by irradiating a beam of a laser onto the top face of the cover piece to cut out the coating layer (3) in a contemplated pattern (4) for visual display upon illumination from inside. The ink contained a heat resistance promoting agent for preventing possible deteriorating of the printing layer by the irradiation by the laser beam. The carbon black content of the light-blocking layer (3) was resticted to at highest 10% based on the weight of the base polymer thereof, in order to reduce wear-off of carbon black. The light-blocking layer (3) also contained a matting agent based on silica.

According to the present invention, it is now made possible to provide finger touch covers for illuminated switches superior in wear resistance and in oil-resistance, since a higher bonding performance between the finger touch cover and the printing layer applied thereto can be attained as compared with the standard (conventional) technique. Especially, by choosing the printing ink, a combination of higher bonding performance to the substrate finger touch cover with a higher oil-resistance can be attained.

In addition, it is now made possible by the multicomponent rubber material, according to the present invention, to eliminate the existing disadvantage of dust staining on the finger touch cover by dust floating in the air during the preparation process through the printing, coating and drying, due to facilitated static charge when using a silicone rubber for the finger touch cover as in the conventional process, whereby an increase in the productivity is achieved by the increase in the production yield. Another advantage of the present invention exists in the reduction of the production cost due to the exclusion of expensive silicone rubber. By the decrease of the amount of worn-off carbon black, undesirable staining of the finger etc. becomes excluded. When a coating layer based on polyurethane is employed, a higher mechanical strength of the coating layer which is as high as 10 fold of that based on silicone can be realized, whereby illuminated switches having high reliability are realized.

We claim:

1. A finger touch member of an illuminated switch prepared by a process comprising
    printing or coating a surface of a cover piece made of a multicomponent rubber material composed of, as essential components, 90–70% by weight of EPDM and 5–30% by weight of a liquid polymerized butadiene rubber, with an ink of contemplated color,
    covering the entire top face of the resulting printed or coated cover piece with a light blocking coating layer, and
    irradiating the so covered top face of the cover piece with a laser beam to cut out the coating layer in a contemplated pattern.

2. The member of claim 1 wherein the ink is based on a polyester or polyurethane.

3. The member of claim 1 wherein the coating material for the light blocking coating is based on a polyurethane.

4. The member of claim 1 wherein the ink is based on a polyester or polyurethane and the coating material for the light blocking coating is based on a polyurethane.

5. A finger touch member of an illuminated switch prepared by a process comprising
    printing or coating a surface of a cover piece made of a multicomponent rubber material composed of, as essential components, 90–65% by weight of EPDM, 5–25% by weight of a first liquid polymerized butadiene rubber and 5–10% by weight of a second liquid polymerized butadiene rubber, with an ink of contemplated color, covering the entire top face of the resulting printed or coated cover piece with a light blocking coating layer, and irradiating the so covered top face of the cover piece with a laser beam to cut out the coating layer in a contemplated pattern, said first polymerized butadiene providing the multicomponent rubber material with high resiliency and with bonding affinity for such ink layer and said second polymerized butadiene being different from the first in providing correspondingly higher resiliency to the multicomponent rubber material and correspondingly increased bonding of the resulting printed or coated ink layer thereto.

6. The member of claim 5 wherein the ink is based on a polyester or polyurethane.

7. The member of claim 5 wherein the coating material for the light blocking coating is based on a polyurethane.

8. The member of claim 5 wherein the ink is based on a polyester or polyurethane and the coating material for the light blocking coating is based on a polyurethane.

* * * * *

UNITED STATES PATENT AND TRADEMARK OFFICE
CERTIFICATE OF CORRECTION

PATENT NO.  : 5,407,721

DATED       : April 18, 1995

INVENTOR(S) : Fujigaki et al

It is certified that error appears in the above-identified patent and that said Letters Patent is hereby corrected as shown below:

On the Title page, item [75], inventors:

"Keiko Hartgae" should be changed to read --Keiko Harigae--.

Signed and Sealed this

Twenty-second Day of August, 1995

*Attest:*

BRUCE LEHMAN

*Attesting Officer*   *Commissioner of Patents and Trademarks*